United States Patent
Rajagopal et al.

(10) Patent No.: US 12,177,073 B2
(45) Date of Patent: Dec. 24, 2024

(54) CLOUD AUTOMATION MICROBOTS AND METHOD OF USE

(71) Applicant: RELIANCE JIO INFOCOMM USA, INC., Frisco, TX (US)

(72) Inventors: Arun Rajagopal, Frisco, TX (US); Abhijeet Singh, Seattle, WA (US); Venugopal Kanumalla, Frisco, TX (US)

(73) Assignee: RELIANCE JIO INFOCOMM USA, INC., Frisco, TX (US)

( * ) Notice: Subject to any disclaimer, the term of this patent is extended or adjusted under 35 U.S.C. 154(b) by 0 days.

(21) Appl. No.: 17/713,490

(22) Filed: Apr. 5, 2022

(65) Prior Publication Data

US 2023/0318919 A1  Oct. 5, 2023

(51) Int. Cl.
*G06F 15/16* (2006.01)
*H04L 41/0823* (2022.01)
*H04L 67/10* (2022.01)

(52) U.S. Cl.
CPC ......... *H04L 41/0823* (2013.01); *H04L 67/10* (2013.01)

(58) Field of Classification Search
CPC .............................. H04L 41/0823; H04L 67/10
See application file for complete search history.

(56) References Cited

U.S. PATENT DOCUMENTS

| | | | |
|---|---|---|---|
| 7,523,892 B2 | 4/2009 | Cook | |
| 7,685,083 B2 | 3/2010 | Fairweather | |
| 7,689,510 B2 | 3/2010 | Lamkin et al. | |
| 8,112,176 B2 | 2/2012 | Solomon | |
| 8,566,115 B2 | 10/2013 | Moore | |
| 8,958,662 B1 | 2/2015 | Grosz et al. | |
| 9,367,362 B2 | 6/2016 | Kern | |
| 9,692,707 B2 | 6/2017 | Tang et al. | |
| 9,740,757 B1 | 8/2017 | Gilder et al. | |
| 9,794,370 B2 | 10/2017 | Abbasi et al. | |
| 9,911,290 B1 | 3/2018 | Zalewski et al. | |
| 9,960,637 B2 | 5/2018 | Sanders et al. | |
| 10,221,013 B2 | 3/2019 | Buzan et al. | |
| 10,299,128 B1 | 5/2019 | Suthar et al. | |
| 10,346,621 B2 | 7/2019 | Athuluru Tlrumala et al. | |
| 10,740,293 B2 | 8/2020 | Maturana et al. | |
| 10,746,428 B2 | 8/2020 | Przybylski et al. | |
| 10,769,231 B2 | 9/2020 | Koi et al. | |
| 10,778,534 B2 | 9/2020 | Chitalia et al. | |

(Continued)

OTHER PUBLICATIONS

Notification of Transmittal of the International Search Report and the Written Opinion of the International Search Authority—The European Patent Office—mailed Jul. 3, 2023 for PCT/US23/17572, 15 pages.

*Primary Examiner* — Padma Mundur
(74) *Attorney, Agent, or Firm* — Jackson Walker LLP; Christopher J. Rourk (57) ABSTRACT

A system for configuring a network, comprising a network software installation system operating on a first processor and configured to install a current version of one or more algorithms on each of a plurality of site-specific hardware items and to configure each of the plurality of site-specific hardware items to interoperate with each other. A plurality of microbots operating on one or more of the plurality of site-specific hardware items, each microbot having state and configured to communicate with each other microbot over a microbot network.

20 Claims, 3 Drawing Sheets

(56) References Cited

U.S. PATENT DOCUMENTS

| | | |
|---|---|---|
| 10,834,562 B1 | 11/2020 | Zalewski et al. |
| 10,867,282 B2 | 12/2020 | Glunz |
| 10,999,163 B2 | 5/2021 | Abraham |
| 10,999,251 B2 | 5/2021 | Miriyala et al. |
| 11,124,361 B2 | 9/2021 | Lert et al. |
| 11,138,539 B2 | 10/2021 | Sethi et al. |
| 11,189,368 B2 | 11/2021 | Heath |
| 11,245,573 B1 | 2/2022 | Wagner et al. |
| 2006/0271928 A1* | 11/2006 | Gao .................. G06Q 30/0633 717/176 |
| 2007/0093970 A1 | 4/2007 | Padmanabhan et al. |
| 2011/0246627 A1 | 10/2011 | Kern |
| 2016/0189174 A1 | 6/2016 | Heath |
| 2018/0052451 A1 | 2/2018 | Billi-Duran et al. |
| 2019/0109810 A1 | 4/2019 | Rapaport et al. |
| 2019/0140580 A1 | 5/2019 | Poivet |
| 2019/0207813 A1 | 7/2019 | Uehara et al. |
| 2019/0332785 A1 | 10/2019 | Athuluru Tlrumala |
| 2020/0133666 A1 | 4/2020 | Prinsloo et al. |
| 2020/0136930 A1 | 4/2020 | Szulman et al. |
| 2020/0136932 A1 | 4/2020 | Jangam et al. |
| 2021/0019194 A1 | 1/2021 | Bahl et al. |
| 2021/0241241 A1* | 8/2021 | Lokanath ............. G06Q 20/065 |
| 2021/0389338 A1 | 12/2021 | Kochar et al. |

* cited by examiner

CLOUD AUTOMATION MICROBOTS AND METHOD OF USE

RELATED APPLICATIONS

This non-provisional application is related to U.S. patent application Ser. No. 17/689,430 filed Mar. 8, 2022 entitled "CLOUD AUTOMATION SITE DESIGN AND METHOD" and is related to U.S. patent application Ser. No. 17/750,473 filed May 23, 2022 entitled "CLOUD AUTOMATION AGENTS AND METHOD OF USE", and is related to U.S. patent application Ser. No. 17/734,480 filed May 2, 2022 entitled "AUTOMATED BOT FOR ERROR-FREE RACKING-STACKING", which are hereby incorporated by reference for all purposes, as if presented herein in their entireties.

TECHNICAL FIELD

The present disclosure relates generally to cloud computing, and more specifically to a cloud automation microbots that can be used to provision and maintain a cloud computing system and their method of use.

BACKGROUND OF THE INVENTION

Provisioning and maintaining a cloud computing system is a manually intensive activity.

SUMMARY OF THE INVENTION

A system for configuring a network, comprising a network software installation system operating on a first processor and configured to install a current version of one or more algorithms on each of a plurality of site-specific hardware items and to configure each of the plurality of site-specific hardware items to interoperate with each other. The system further includes a plurality of microbots operating on one or more of the plurality of site-specific hardware items, each microbot having state and configured to communicate with each other microbot over a microbot network.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

In the description that follows, like parts are marked throughout the specification and drawings with the same reference numerals. The drawing figures may be to scale and certain components can be shown in generalized or schematic form and identified by commercial designations in the interest of clarity and conciseness.

The present disclosure is related to systems and algorithmic processes that are typically implemented in software that operates on a processor, to enable telecom operators and other network operators to fully mechanize the process of installing and configuring hardware and associated software for a cloud computing environment or other suitable computing or telecommunications environments, such as servers, switches, routers, edge servers, networking software, server software, patch cabling, radio band units and other hardware and software used for build and operations of distributed telecommunications company cloud and edge infrastructure. The present disclosure provides the technical features of enabling telecom operators and hardware Original Equipment Manufacturer (OEM) partners to provide a consistent and reliable experience to the end consumer of the cloud computing environment by enabling error free deployment of hardware and software elements.

In one example embodiment, the disclosed automation system and algorithmic processes can be used by an OEM vendor to rack, stack and deliver hardware to a customer, to install the hardware without any errors or re-runs, to configure the hardware with associated software, to resolve complex logistics challenges, to configure data centers, mobility locations, remote edge locations or to provide other suitable functions. The present disclosure can be used to provide on-demand infrastructure racking layout, automated workflows and other suitable functions. The present disclosure can include an application that runs on a mobile device or laptop computer, to assist an installer and also to certify the installed system components and to provide sign-off for the work after it has been completed.

The present disclosure can be implemented using components that run centrally and provide a dashboard with target design configurations of hardware to be stacked and a smart application that runs on a mobile device, either connected or in a disconnect mode, as well as other suitable configurations. In one example embodiment, machine learning models can be used to detect physical networking connections such as RJ45 compatible devices, fiber optic media, small form factor pluggable devices, coaxial compatible devices, HDMI devices and so forth, to interpret design information that is obtained from a cloud software repository, to validate a configuration state and to perform other suitable functions, such as to determine whether a device is plugged in to a port or not, if it is in the right port as per the design specification, whether the software applications installed on the device are correct and are configured correctly and other suitable functions. A workflow running on the remote agent can be used to finalize the racking-stacking in a series of steps, such as where a user can generate image or video data that is analyzed to determine whether equipment is in a proper configuration, where machine learning can instruct the user to perform a next action based upon success on current step and in other suitable embodiments.

The present disclosure can be implemented using microbots, which are software constructs that are used to automate the conversion of site design data into a working cloud computing system or other suitable systems, such as by using a series of workflows in the form of directed acyclic graphs, flowcharts, state diagrams, system diagrams or in other suitable manners. The microbots can be implemented as a distributed application (DAPP), an automation agent or in other suitable manners. A distributed global ledger such as a blockchain or other suitable mechanisms can be used to function as a job pool, and the microbots can register themselves on a microbot network and can pick up jobs from the microbot network using the distributed global ledger. The microbots can be embedded into the cloud infrastructure framework and can be configured as self-propagating intelligent components that scale as the infrastructure scales. The use of a microbots-based framework adds flexibility to the provisioning and management of the infrastructure capacity.

In general, a microbot can be an agent, an object or other programming paradigms that are portable and which can be instantiated on a platform, such as by an associated system, another microbot or in other suitable manners. Microbots can be instantiated upon demand, such as to dynamically accommodate changes to system hardware to allow new hardware components to be provisioned and maintained. The microbot can have a user interface component that generates queries for a predetermined user or class of users, such as an operator or installer. In addition, the microbots can interface with a microbot network, which can include a job pool of functions that need to be performed by a specific microbot or class of microbots, as discussed further herein.

The provisioning functions performed by microbots include installing and configuring software on servers, routers and switches (including operating system software and application software), connecting servers, routers and switches to middleware, networks, and storage and other suitable provisioning functions. The provisioning functions performed for a cloud computing network include software for instantiating cloud computing services by coordinating loads on servers, routers and switches. In contrast, the provisioning functions performed on an enterprise network include software for providing enterprise network services, such as access to application servers, file servers, printers and other hardware. The management functions performed by microbots include monitoring a server, a router or a switch to ensure that it is operating at a specific level (e.g. data throughput, CPU function), maintaining a server, a router or a switch (such as to install a software update), backing up data from a server, a router or a switch, performing a security function for a server, a router or a switch or performing other suitable management functions. The management functions performed for a cloud computing network include software for managing cloud computing services by optimizing loads on servers, routers and switches. In contrast, the management functions performed on an enterprise network include software for managing enterprise network services, such as monitoring application servers, file servers, printers and other hardware for proper function.

Figure 1:
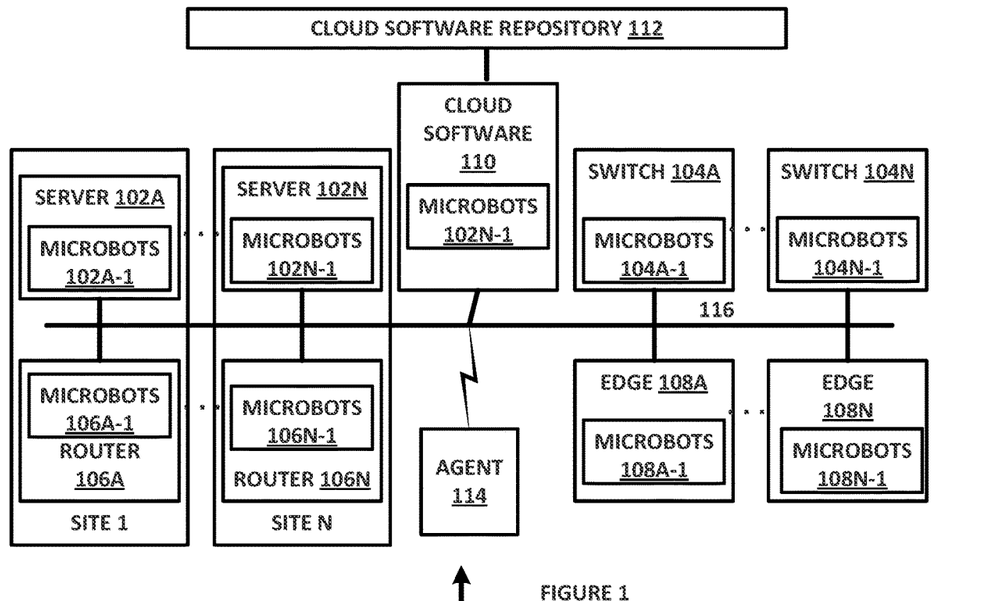
FIG. 1 is a diagram of a system for cloud computing site hardware and automated cloud software installation that includes microbots, in accordance with an example embodiment of the present disclosure.

FIG. 1 is a diagram of a system 100 for cloud computing site hardware and automated cloud software installation that includes microbots, in accordance with an example embodiment of the present disclosure. System 100 includes servers 102A though 102N, each with one or more associated microbots 102A-1 through 102N-1, switches 104A through 104N, each with one or more associated microbots 104A-1 through 104N-1, routers 106A through 106N, each with one or more associated microbots 106A-1 through 106N-1, edge servers 108A through 108N, each with one or more associated microbots 108A-1 through 108N-1, cloud software installation and maintenance system 110 with microbot 110-1, cloud software repository 112 and agent 114, which are coupled over network 116, and which can be implemented as a wireline data communications medium, a wireless data communications medium, an optical data communications medium, other suitable data communications media or a suitable combination of data communications media.

Servers 102A though 102N can be implemented as separate hardware enclosures containing individual systems, separate hardware racks containing multiple system elements such as blades or cards, individual system elements such as blades or cards or other suitable systems or devices that are used in a cloud computing environment to provide cloud computing services upon demand. Servers 102A though 102N can be implemented at a single site, or at a plurality of different sites, such as where each server 102A through 102N is at a dedicated site 1 through site N as shown, where groups of servers 102A through 102N are at two or more different sites, where the number of different sites is less than the total number of servers, or in other suitable embodiments. Servers 102A though 102N can include one or more processors, one or more memory devices, input/output devices, network interfaces and other suitable components to allow them to be installed in a cloud computing system and automatically configured by cloud software system 110 or in other suitable manners to provide cloud computing services.

Microbots 102A-1 through 102N-1 can be implemented as one or more algorithms or other software constructs that perform predetermined functions associated with servers 102A through 102N, respectively. In one example embodiment, microbots 102A-1 through 102N-1 can interface with other components of system 100 or each other to implement a provisioning task, a configuration task or other suitable tasks. In this example embodiment, a microbot can query a component for configuration data, can transfer responsibility for a function from its associated component to a different component, can identify a new component that has been installed in the system and can interface with the component directly or through an associated microbot to provision the component, can detect a modified component configuration and can obtain configuration data for the modified component configuration, can generate a user query for a predetermined user to provide input data or can perform other suitable functions.

Switches 104A through 104N can be implemented as separate hardware enclosures containing individual systems, separate hardware racks containing multiple system elements such as blades or cards, individual system elements such as blades or cards or other suitable systems or devices that are used in a cloud computing environment to provide network switching services upon demand, including wireless data switching, wireline data switching, fiber optic data switching, a suitable combination of switching functions or other suitable data switching functions. Switches 104A though 104N can be implemented at a single site, or at a plurality of different sites, such as where each switch 104A through 104N is at a dedicated site 1 through site N as shown, where groups of switches 104A through 104N are at two or more different sites, where the number of different sites is less than the total number of servers, or in other suitable embodiments. The sites associated with servers 102A though 102N can be the same as the sites associated with switches 104A through 104N, can be different, or can include a suitable combination of dedicated sites and shared sites. Switches 104A through 104N can include one or more processors, one or more memory devices, input/output devices, network interfaces and other suitable components to allow them to be installed in a cloud computing system and automatically configured by cloud software system 110 or in other suitable manners to provide network switching for a cloud computing environment.

Microbots 104A-1 through 104N-1 can be implemented as one or more algorithms or other software constructs that perform predetermined functions associated with switches 104A through 104N, respectively. In one example embodiment, microbots 104A-1 through 104N-1 can interface with other components of system 100 or each other to implement a provisioning task, a configuration task or other suitable tasks. In this example embodiment, a microbot can query a component for configuration data, can transfer responsibility for a function from its associated component to a different component, can identify a new component that has been installed in the system and can interface with the component directly or through an associated microbot to provision the component, can detect a modified component configuration and can obtain configuration data for the modified component configuration, can generate a user query for a predetermined user to provide input data or can perform other suitable functions.

Routers 106A through 106N can be implemented as separate hardware enclosures containing individual systems, separate hardware racks containing multiple system elements such as blades or cards, individual system elements such as blades or cards or other suitable systems or devices that are used in a cloud computing environment to provide network routing services upon demand. Routers 106A though 106N can be implemented at a single site, or at a plurality of different sites, such as where each router 106A through 106N is at a dedicated site 1 through site N as shown, where groups of routers 106A through 106N are at two or more different sites, where the number of different sites is less than the total number of servers, or in other suitable embodiments. The sites associated with servers 102A though 102N and/or switches 104A through 104N can be the same as the sites associated with routers 106A through 106N, can be different, or can include a suitable combination of dedicated sites and shared sites. Routers 106A through 106N can include one or more processors, one or more memory devices, input/output devices, network interfaces and other suitable components to allow them to be installed in a cloud computing system and automatically configured by cloud software system 110 or in other suitable manners to provide network routing for a cloud computing environment.

Microbots 106A-1 through 106N-1 can be implemented as one or more algorithms or other software constructs that perform predetermined functions associated with routers 106A through 106N, respectively. In one example embodiment, microbots 106A-1 through 106N-1 can interface with other components of system 100 or each other to implement a provisioning task, a configuration task or other suitable tasks. In this example embodiment, a microbot can query a component for configuration data, can transfer responsibility for a function from its associated component to a different component, can identify a new component that has been installed in the system and can interface with the component directly or through an associated microbot to provision the component, can detect a modified component configuration and can obtain configuration data for the modified component configuration, can generate a user query for a predetermined user to provide input data or can perform other suitable functions.

Edge servers 108A through 108N can be implemented as separate hardware enclosures containing individual systems, separate hardware racks containing multiple system elements such as blades or cards, individual system elements such as blades or cards or other suitable systems or devices that are used in a cloud computing environment to provide edge network services upon demand. Edge servers 108A though 108N can be implemented at a single site, or at a plurality of different sites, such as where each edge server 108A through 108N is at a dedicated site 1 through site N as shown, where groups of edge servers 108A through 108N are at two or more different sites, where the number of different sites is less than the total number of servers, or in other suitable embodiments. The sites associated with servers 102A though 102N and/or switches 104A through 104N and/or routers 106A through 106N can be the same as the sites associated with edge servers 108A through 108N, can be different, or can include a suitable combination of dedicated sites and shared sites. Edge servers 108A through 108N can include one or more processors, one or more memory devices, input/output devices, network interfaces and other suitable components to allow them to be installed in a cloud computing system and automatically configured by cloud software system 110 or in other suitable manners to provide edge network services for a cloud computing environment.

Microbots 108A-1 through 108N-1 can be implemented as one or more algorithms or other software constructs that perform predetermined functions associated with edge servers 108A through 108N, respectively. In one example embodiment, microbots 108A-1 through 108N-1 can interface with other components of system 100 or each other to implement a provisioning task, a configuration task or other suitable tasks. In this example embodiment, a microbot can query a component for configuration data, can transfer responsibility for a function from its associated component to a different component, can identify a new component that has been installed in the system and can interface with the component directly or through an associated microbot to provision the component, can detect a modified component configuration and can obtain configuration data for the modified component configuration, can generate a user query for a predetermined user to provide input data or can perform other suitable functions.

Cloud software installation and maintenance system 110 can be implemented as one or more algorithms operating on a processor that cause the processor to interact with servers 102A though 102N, switches 104A through 104N, routers 106A through 106N, edge servers 108A through 108N and other components, to install algorithms, applications and other instructions, to configure servers 102A though 102N, switches 104A through 104N, routers 106A through 106N, edge servers 108A through 108N and other components with a site data configuration and a site physical configuration, and to perform other suitable functions. In one example embodiment, cloud software installation and maintenance system 110 can be implemented using GITOPS from GIT-LAB, located in San Francisco, CA, or other suitable software installation and maintenance systems. Cloud software installation and maintenance system 110 can install specific algorithms on specific predetermined components, such as to configure and provision specific servers to interoperate with other specific servers, specific switches to interoperate with specific servers, specific routers to interoperate with specific servers and switches, specific edge routers to interoperate with specific servers, routers and switches and so forth, so as to provide a fully-configured and provisioned cloud computing system, data communications network or other suitable systems with minimal operator involvement.

Cloud software repository 112 can be implemented as one or more algorithms operating on a processor that cause the processor to provide operational code for servers 102A though 102N, switches 104A through 104N, routers 106A through 106N, edge servers 108A through 108N and other suitable equipment, to maintain and modify algorithms, applications and other instructions, to provide configuration information for use with servers 102A though 102N, switches 104A through 104N, routers 106A through 106N, edge servers 108A through 108N and other suitable components with a site data configuration and a site physical configuration, and to perform other suitable functions. In one example embodiment, cloud software repository 112 can be implemented using GITHUB from GITLAB, located in San Francisco, CA, or other suitable software development and version control systems.

Agent 114 can be implemented as one or more algorithms operating on a processor that cause the processor to interact with cloud software installation and maintenance system 110 and other components of system 100. In one example embodiment, a user can access each component locally and over network 116 to verify that the component has been properly installed and provisioned, such as by using the algorithmic processes and functionality disclosed here or other suitable functionality.

In operation, system 100 provides predefined tasks, allowable site configurations, allowable network details, allowable hardware details, allowable software details and other suitable data for a cloud network installation or other suitable systems. A network design document can be provided in an easy to read format, such as a markup language like XML, yet another markup language (YAML) or other suitable formats that are easy for a human operator to read, and which can be used to implement the process of cloud computing network deployment. In one example embodiment, the design document can include:

A) GITOPS predefined tasks that are stored in multiple files, such as where the file structure is used to provide a site design, such as a data center, a cloud computing network or other suitable systems. The file structure can include code for each server, each data switch, each data router, each edge server and other suitable components, to provide a code delivery mechanism.

B) Site configuration data—the names of equipment (servers, switches, routers), IP addresses and other suitable site configuration data.
C) Site Physical location data, such as building and room numbers, street addresses and so forth.
D) Data Center identifiers.
E) Domain Name System (DNS) data and other infrastructure details, such as a site type (ex: Green, Orange, Red), a form factor and other suitable data.
F) Network Details (such as a single file, multiple files, a YAML file with no specified start and end syntax or other suitable data structures).
G) IP address pools, spine and leaf configurations, border gateway protocol, routing networking layer.
H) Dynamic host configuration protocol information, Preboot eXecution Environment (PXE) information.
I) Hardware Details (separate or one file)
K) Physical node configuration data, including firmware, BIOS, out of band addresses, rack layouts, server layouts, host profiles, disk partitioning and so forth.
L) Software details (separate or one file—software to run cloud and applications in cloud all software runs in cloud), operating system and Boot Configurations, hypervisors, container runtimes, repositories.

In one example embodiment, system 100 can be used to perform a series of steps for provisioning a site design. In a first step, a design blueprint, templates or other suitable code structures can be created. In the second step, the design blueprint can be translated to site-specific code documents. Cloud parameters such as Internet Protocol addresses, DNS data, network time protocol (NTP) data and so forth can be applied. Information from inventory planning applications can be translated to virtual network functions and applications details, security configurations can be applied from information security frameworks or guidelines, Artificial Intelligence and Machine Learning toolsets can be used to verify and validate inputs and other suitable functions can also or alternatively be performed. A final step can include committing an instance of the site design to a central repository and triggering of blockchain events for next steps.

Each item of hardware can also have an associated site or location, such as Site 1 through Site N for servers 102A through 102N, routers 106A through 106N, edge servers 108A through 108N and so forth. While the example embodiment shown in system 100 includes server 102A, router 106A and edge server 108A at Site 1 and server 102N, router 106N and edge server 108N at Site N, other suitable combinations of sites and equipment can also or alternatively be used. For example, a first site can be used for all servers and a second site can be used for all routers, different sites can have different numbers and combinations of equipment or other suitable configurations can be used.

Figure 2:
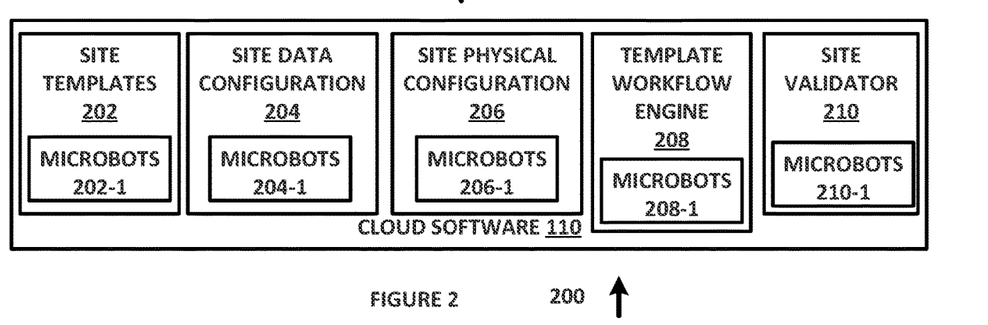
FIG. 2 is a diagram of a cloud software installation and update system that includes microbots, in accordance with an example embodiment of the present disclosure.

FIG. 2 is a diagram 200 of a cloud software installation and update system 110 that includes microbots, in accordance with an example embodiment of the present disclosure. Cloud software installation and update system 110 includes site templates system 202, site configuration system 204, site physical configuration system 206, template workflow engine 208, site validator 210 and microbots 202-1 through 210-1, each of which can be implemented in hardware or a suitable combination of hardware and software.

Site templates system 202 can be implemented as one or more algorithms operating on a processor that cause the processor to select and install one or more code templates on a plurality of devices associated with a cloud computing site or other suitable sites, such as directly over a network, using microbots in combination with a microbot network or in other suitable manners. In one example embodiment, templates can be designed for sites with a predetermined number of components, such as a 10 server cloud, which can include a predetermined number of switches, routers, edge servers and other suitable devices. Site templates system 202 can detect a site configuration from a setting or detected hardware components and can select a suitable template for use with the site, including automated designation of equipment within the site configuration template. Site templates system 202 can also interface with site configuration data system 204, site physical configuration system 206, template workflow engine 208 and site validator 210 to perform automated installation and provisioning of equipment for a cloud computing system or other suitable systems, such as by using microbots 202-1 or in other suitable manners.

Site data configuration system 204 can be implemented as one or more algorithms operating on a processor that cause the processor to configure site equipment with logical device names such as names of servers and routers, with IP addresses and with other suitable site data, such as directly over a network, using microbots in combination with a microbot network or in other suitable manners. In one example embodiment, the site data can be defined in advance for specific site templates, and site data configuration system 204 can be used in conjunction with a local installer to verify that the site data has been properly configured, such as by using microbots 204-1 or in other suitable manners.

Site physical configurations system 206 can be implemented as one or more algorithms operating on a processor that cause the processor to identify physical configurations and locations of servers, routers and so forth, such as directly over a network, using microbots in combination with a microbot network or in other suitable manners. In one example embodiment, a site map or other suitable data can be used to associate specific pieces of equipment with specific floors, rooms, off-site locations and other suitable data, such as by using microbots 206-1 or in other suitable manners.

Template workflow engine 208 can be implemented as one or more algorithms operating on a processor that cause the processor to obtain information from inventory planning software applications and to translate the data to virtual network functions and associated application details, to obtain security configuration data from an information security framework or guidelines, and to perform other suitable functions associated with implementing a template workflow, such as directly over a network, using microbots in combination with a microbot network or in other suitable manners. In one example embodiment, the template workflow engine can install sets of code on equipment in accordance with a predetermined workflow, such as to configure all servers, routers, switches and edge servers first as individual hardware devices, and then to install network software such as virtual network functions and network security, to configure servers associated with a switch or router in parallel and then to interconnect the switches that aggregate traffic from servers directly into a spine or network core, to implement a spine and leaf full-mesh topology, or in other suitable manners, such as by using microbots 208-1 or in other suitable manners.

Site validator 210 can be implemented as one or more algorithms operating on a processor that cause the processor to implement artificial intelligence or machine learning toolsets to verify and validate inputs to hardware components and network systems, such as directly over a network, using microbots in combination with a microbot network or in other suitable manners. In one example embodiment, site validator 210 can use a site blueprint or templates and can verify that the functions associated with the blueprint or templates are configured properly, such as by using microbots 210-1 or in other suitable manners.

Figure 3:
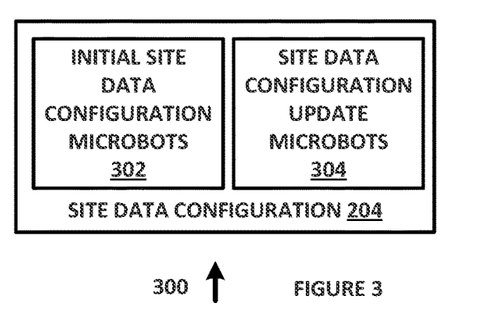
FIG. 3 is a diagram of a site data configuration system that uses microbots, in accordance with an example embodiment of the present disclosure.

FIG. 3 is a diagram 300 of a site data configuration system 204 that includes microbots, in accordance with an example embodiment of the present disclosure. Site data configuration system 204 includes initial site data configuration microbots 302 and site data configuration update microbots 304, each of which can be implemented in hardware or a suitable combination of hardware and software.

Initial site data configuration microbots 302 can be implemented as one or more algorithms operating on a processor that create or manipulate an object that has state and that includes a plurality of state variables, including state variables for an initial site physical configuration. In one example embodiment, the state variables can define an initial site data configuration, which can include a file structure, a data structure or other suitable mechanisms for associating site data that is required to configure hardware with specific items of hardware, such as to allow the hardware to be re-configured in the event of the failure of one or more pieces of equipment or for other suitable purposes. The microbots can also or alternatively post jobs on a microbot network that are associated with determining the initial site configuration, such as by querying data from other components of the site or in other suitable manners.

Site data configuration update microbots 304 can be implemented as one or more algorithms operating on a processor that update an object that has state and that includes a plurality of state variables, including state variables for an initial site physical configuration. In one example embodiment, the updates can be implemented incrementally, as part of a template that includes multiple items of equipment or in other suitable manners. The microbots can also or alternatively post jobs on a microbot network that are associated with updating the site configuration, such as by querying data from other components of the site or in other suitable manners.

Figure 4:
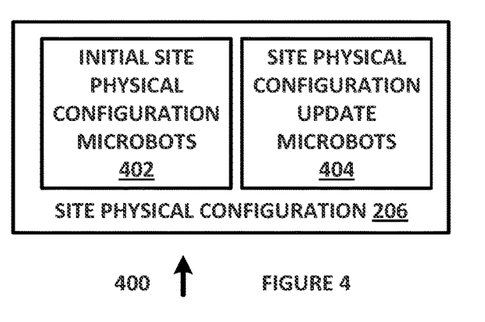
FIG. 4 is a diagram of a site physical configuration system that uses microbots, in accordance with an example embodiment of the present disclosure.

FIG. 4 is a diagram 400 of a site physical configuration system 206 that includes microbots, in accordance with an example embodiment of the present disclosure. Site physical configuration system 206 includes initial site physical configuration microbots 402 and site physical configuration update microbots 404, each of which can be implemented in hardware or a suitable combination of hardware and software.

Initial site physical configuration microbots 402 can be implemented as one or more algorithms operating on a processor that create or manipulate an object that has state and that includes a plurality of state variables, including state variables for an initial site physical configuration. In one example embodiment, the initial site physical configuration state variables can cause one or more microbots to locate equipment identifiers, equipment physical locations or other associated site physical data that is required to identify hardware, such as to allow the hardware to be located in the event of the failure of one or more pieces of equipment or for other suitable purposes. The microbots can also or alternatively post jobs on a microbot network that are associated with determining the initial site physical configuration, such as by querying data from other components of the site or in other suitable manners.

Site physical configuration update microbots 404 can be implemented as one or more algorithms operating on a processor that cause one or more microbots to update a site physical configuration to include replacement equipment, new equipment, expanded functions or other suitable site updates. In one example embodiment, the microbots can implement the updates incrementally, as part of a template that includes multiple items of equipment or in other suitable manners. The microbots can also or alternatively post jobs on a microbot network that are associated with updating the site physical configuration, such as by querying data from other components of the site or in other suitable manners.

Figure 5:
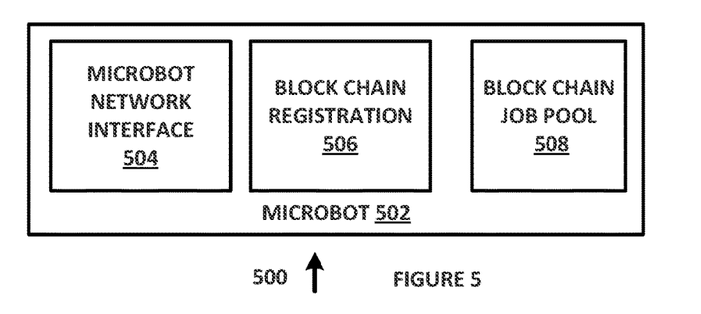
FIG. 5 is a diagram of a microbot, in accordance with an example embodiment of the present disclosure.

FIG. 5 is a diagram 500 of a microbot 502, in accordance with an example embodiment of the present disclosure. Microbot 502 includes microbot network interface 504, block chain registration 506 and block chain job pool 508, each of which can be implemented in hardware or a suitable combination of hardware and software. Microbot 502 can be typical of the microbots disclosed herein, including but not limited to microbots 102A-1 through 102N-1, microbots 104A-1 through 104N-1, microbots 106A-1 through 106N-1, microbots 108A-1 through 108N-1, microbots 110-1, microbots 202-1 through 210-1 and other suitable microbots. Microbot 502 can be implemented as one or more algorithms that create a functionally distinct entity, such as an agent, an object or other suitable software constructs that can be portable between processors, such as to be self-replicating or for other suitable purposes.

Microbot network interface 504 can be implemented as one or more algorithms operating on a processor that cause the processor to interface a microbot with a microbot network. In one example embodiment, the microbot network can be a block chain algorithm that is used to encode secure messaging between microbots or classes of microbots, between microbots and hardware components of a network or computing system, such as a cloud computing system, or other suitable microbot networks. In another example embodiment, the microbot network can be a suitable communications medium that is used nonexclusively or exclusively by microbots, such as a bandwidth, a frequency range, an out of band network medium or other suitable mechanisms. Microbot network interface 504 performs suitable functions to allow microbot 502 to communicate over the microbot network, such as address registration, messaging, listening for messages and other functions.

Block chain registration 506 can be implemented as one or more algorithms operating on a processor that cause the processor to register data, a job or otherwise interface with a block chain algorithm. In one example embodiment, block chain registration 506 can be used by a microbot to register a job that needs to be performed by one or more components of a cloud computing system, such as a provisioning task, a maintenance task or other suitable tasks. In another example embodiment, block chain registration can register a status update for a job on the block chain, such as when a job has been completed, if the job was terminated, if an additional task is required to complete the job or other suitable status updates.

Block chain job pool 508 can be implemented as one or more algorithms operating on a processor that cause the processor to generate a job pool for a microbot network. In one example embodiment, the job pool can include jobs that the microbot has registered on the block chain network, jobs that the microbot has accepted from the block chain network, jobs that other microbots have accepted on the block chain network that the microbot is monitoring for completion data or other suitable job pool data. In another example embodiment, the job pool can be broken down into classifications, such as jobs for specific types of components (such as servers, switches and routers), jobs for specific types of status (such as unassigned, assigned and completed) or other suitable classifications.

Figure 6:
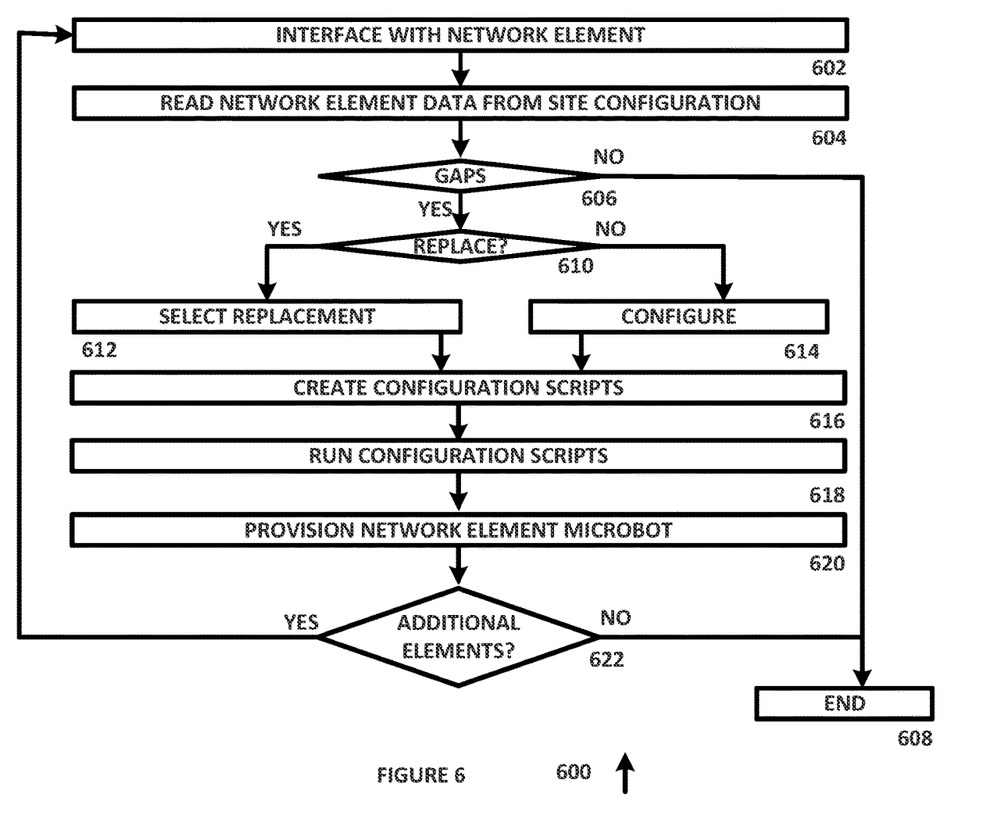
FIG. 6 is a diagram of an algorithm for cloud computing site hardware and automated cloud software installation using microbots, in accordance with an example embodiment of the present disclosure.

FIG. 6 is a diagram of an algorithm 600 for cloud computing site hardware and automated cloud software installation using microbots, in accordance with an example embodiment of the present disclosure. While algorithm 600 is described in regards to cloud computing, it can also or alternatively be used for enterprise networks, telecommunications data processing or other suitable applications. Algorithm 600 can be implemented on one or more processors.

Algorithm 600 begins at 602, where cloud hardware is installed at one or more sites. In one example embodiment, the cloud hardware can be selected based on one of a plurality of design configurations, such as a 10 server configuration, a 20 server configuration and so forth, to support an anticipated demand for services or for other suitable purposes. The algorithm then proceeds to 604.

At 604, site data configuration files are created. In one example embodiment, the site data configuration files can be based on one or more templates, where site-specific data is provided at placeholders in the template, such as using an automated data discovery process, an operator-assisted data discovery process or other suitable processes. The algorithm then proceeds to 606.

At 606, site hardware configuration files are created. In one example embodiment, the site hardware configuration files can be based on one or more templates, where site-specific hardware is provided at placeholders in the template, such as using an automated equipment discovery process, an operator-assisted equipment discovery process or other suitable processes. The algorithm then proceeds to 608.

At 608, one or more templates are translated using site data configuration files and hardware configuration files. In one example embodiment, template translation can include executing one or more processes using the site data configuration files and hardware configuration files to create a site-specific blueprint or other suitable data. The algorithm then proceeds to 610.

At 610, the site is validated. In one example embodiment, validation can be performed by one or more artificial intelligence or machine leaning processes, using operator-assisted processes or in other suitable manners. The algorithm then proceeds to 612.

At 612, it is determined whether errors are present. In one example embodiment, error indications can be generated during the validation process, such as when a design application fails to initiate, when a design routing protocol is not implemented or for other nonconformities. If it is determined that errors are not present, then the algorithm proceeds to 614 where the site is released for operational use, otherwise the algorithm proceeds to 616.

At 616, it is determined whether an automated fix for the error exists, a configuration for operation with a difference exists, or if other suitable solutions are available. If it is determined that a solution is available, then the solution is implemented at 620 and the algorithm returns to 608, otherwise the algorithm proceeds to 618, where an operator notification is generated for manual resolution.

In operation, algorithm 600 provides for cloud computing site hardware and automated cloud software installation for an entire cloud computing system. Although algorithm 600 is shown as a flowchart, a person of skill in the art will recognize that it can also or alternatively be implemented using object-oriented programming, as a state diagram, as a ladder diagram, as a suitable combination of programming paradigms or in other suitable manners.

Figure 7:
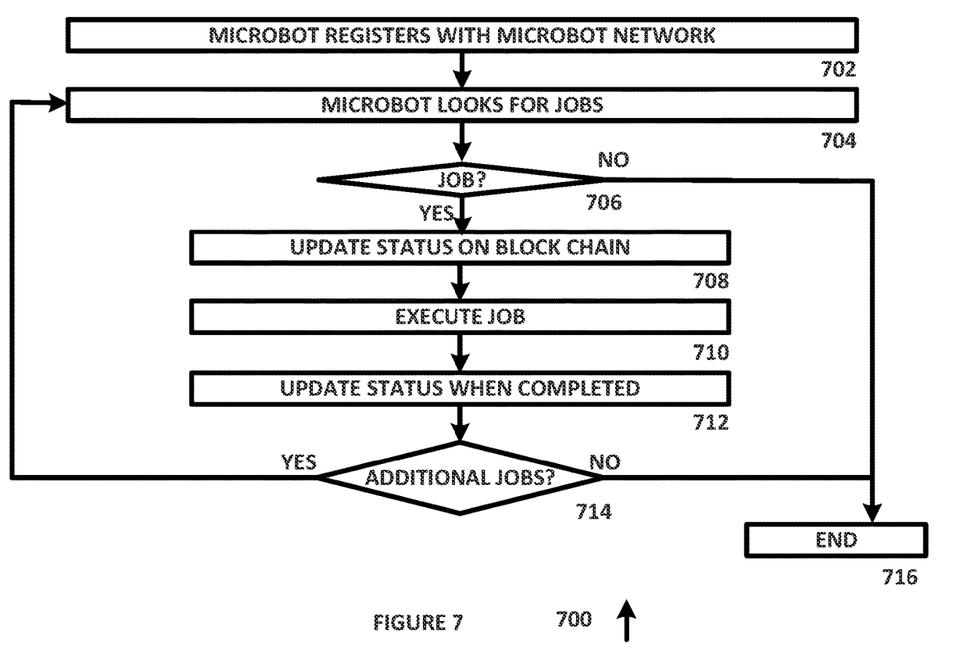
FIG. 7 is a diagram of an algorithm for microbot use in a microbot network, in accordance with an example embodiment of the present disclosure.

FIG. 7 is a diagram of an algorithm 700 for microbot use in a microbot network, in accordance with an example embodiment of the present disclosure. Algorithm 700 can be implemented on one or more processors.

Algorithm 700 begins at 702, where a microbot registers with microbot network. In one example embodiment, a microbot can be implemented as an object that has state and that includes a plurality of state variables, including a state variable for indicating availability on a microbot network. The microbot network can include a plurality of microbots with associate state and address data, where communications over the microbot network can be accomplished using a block chain algorithm, standard networking protocols or in other suitable manners. The microbot network can be implemented using microbot components and systems operating on traditional networking hardware elements, such as servers, switches and routers, or in other suitable manners. The algorithm then proceeds to 704.

At 704, the microbot looks for a job that has been posted to the microbot network. In one example embodiment, jobs can be posted using a block chain algorithm, where block chain entries identify locations on the block chain of open jobs, assigned jobs, completed jobs and so forth. The jobs can include job identifiers that allow similar jobs to be identified by a microbot and to be used by the microbot to determine configuration settings or other suitable data. The algorithm then proceeds to 706.

At 706, if it is determined that there are no jobs, the algorithm proceeds to 716 and terminates. Otherwise, if it is determined that a job is available, the algorithm proceeds to 708.

At 708, a status on block chain for the job is updated to indicate that it has been claimed by the microbot. In one example embodiment, a new block chain entry can be compiled that includes a new status identifier that indicates that the job has been claimed by the microbot and that the microbot is executing the job. The algorithm then proceeds to 710.

At 710, the microbot executes the job. In one example embodiment, the job can include performing a function on a specific hardware component, such as to provision a server, router or switch, to perform a management function on a server, router or switch or to perform other suitable functions. The algorithm then proceeds to 712.

At 712, the status of the job is completed on the microbot network job posting. In one example embodiment, the status can be updated on a block chain algorithm to distribute the updated status to other microbots on the microbot network, or other suitable processes can also or alternatively be used. The algorithm then proceeds to 714.

At 714, it is determined whether there are any additional jobs. In one example embodiment, the determination can be made by each microbot on a periodic basis or in other suitable manners. If it is determined that there are additional jobs, the algorithm return to 704, otherwise the algorithm proceeds to 716 and terminates.

In operation, algorithm 700 provides for microbot use in a microbot network. Although algorithm 700 is shown as a flowchart, a person of skill in the art will recognize that it can also or alternatively be implemented using object-oriented programming, as a state diagram, as a ladder diagram, as a suitable combination of programming paradigms or in other suitable manners.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for configuring a network, comprising:
a network software installation system operating on a first processor and configured to install one or more first algorithms on a first hardware item having a processor to convert the processor into a specific purpose processor and one or more second algorithms on a second hardware item having a processor to convert the processor into a specific purpose processor and to configure each of the hardware items to interoperate with each other over a network; and
wherein each of the one or more algorithms comprises a microbot, each microbot having state when operating on a processor and configured to communicate with each other microbot over a microbot network, wherein the network is distinct from the microbot network; and
provisioning the first hardware item and the second hardware item using the microbot network and site-specific design data to transform the first hardware item and the second hardware item into a site-specific first hardware item and a site-specific second hardware item.

2. The system of claim 1 wherein at least one of the microbots is configured for provisioning a cloud computing component by registering with the microbot network and receiving a job from the microbot network to provision the cloud computing component.

3. The system of claim 1 wherein at least one of the microbots is configured for provisioning an enterprise network by registering with the microbot network and receiving a job from the microbot network to provision the enterprise network.

4. The system of claim 1 wherein the first hardware item and the second hardware item comprise a first server and a second server, and each of the first server and the second server includes at least one associated microbot that registers with the microbot network and receiving a job from the microbot network.

5. The system of claim 1 wherein the algorithms for a plurality of servers are configured for specific ones of the plurality of servers and wherein the microbot for each server registers with the microbot network and receives a job from the microbot network to provision the server.

6. The system of claim 1 wherein the algorithms for a plurality of servers are configured to interface with one or more of the microbots and wherein the microbot for each server registers with the microbot network and receives a job from the microbot network to interface with the server.

7. The system of claim 1 wherein the algorithms for a plurality of servers are configured to interface with one or more of the microbots and to interoperate with each other over a network that is separate from the microbot network and wherein the microbot for each of the plurality of servers registers with the microbot network and receives a job from the microbot network to interoperate with the other of the plurality of servers.

8. The system of claim 1 further comprising a site data configuration system operating on a second processor and configured to install specific predetermined site data on each server of a plurality of servers using one or more microbots and wherein each of the one or more microbots registers with the microbot network and receiving a job from the microbot network to install the specific predetermined site data.

9. The system of claim 1 further comprising a site data configuration system operating on a second processor and configured to install specific predetermined site data on each switch of a plurality of switches using one or more microbots.

10. The system of claim 1 further comprising a site physical configuration system operating on a second processor and configured to install specific predetermined site physical configuration data on each server of a plurality of servers using one or more microbots.

11. A method for configuring a network, comprising:
installing one or more algorithms on each of a plurality of hardware items, each having a processor, to convert the processor of each processor into a specific purpose processor using a network software installation system operating on a first processor under algorithmic control;
configuring each of the plurality of hardware items to interoperate with each other using the network software installation system over a first network;

instantiating one or more microbots on one or more of the plurality of hardware items using the one or more algorithms;

configuring the one or more microbots to communicate over a second network that is separate from the first network and to receive a job posted on the second network; and provisioning the hardware items using the one or more microbots and site-specific design data and configuration using site templates to transform the hardware items into site-specific hardware items.

12. The method of claim 11 wherein at least one of the microbots is configured to provision a site design in a cloud computing environment for the plurality of site-specific hardware items.

13. The method of claim 11 wherein at least one of the microbots is configured to provision a new component in an enterprise network as a function of a site design.

14. The method of claim 11 wherein the plurality of site-specific hardware items comprise a plurality of servers, a plurality of switches, a plurality of routers and a plurality of edge servers, each having one or more associated microbots that are configured to provision the associated hardware item as a function of a site template, site data and a site physical configuration.

15. The method of claim 11 wherein the microbots configured for specific ones of a plurality of servers to perform site validation for one of the plurality of servers.

16. The method of claim 11 wherein the microbots are configured for specific ones of a plurality of switches to implement a site physical configuration for the plurality of site-specific hardware items.

17. The method of claim 11 wherein the microbots are configured for specific ones of a plurality of switches and specific ones of a plurality of routers as a function of a site template for the plurality of site-specific hardware items.

18. The method of claim 11 further comprising configuring a site data configuration system operating on a second processor to install specific predetermined site data on each server of a plurality of servers using one or more microbots as a function of a site physical configuration.

19. The method of claim 11 wherein a second network comprises a block chain algorithm.

20. The method of claim 11 further comprising configuring a block chain registration system on each microbot configured to cause the associated microbot to modify a block chain algorithm as a function of the associated site-specific hardware item that the microbot is instantiated at.

* * * * *